(12) United States Patent
Lee et al.

(10) Patent No.: US 12,374,939 B2
(45) Date of Patent: Jul. 29, 2025

(54) ELECTRONIC DEVICE FOR TRANSMITTING WIRELESS POWER HAVING A PLURALITY OF POWER TRANSMISSION COILS AND OPERATING METHOD THEREFOR TO IDENTIFY POSITION OF A WIRELESS POWER RECEPTION DEVICE

(71) Applicant: SAMSUNG ELECTRONICS CO., LTD., Suwon-si (KR)

(72) Inventors: Sangwook Lee, Suwon-si (KR); Sungbum Park, Suwon-si (KR); Youngho Ryu, Suwon-si (KR); Kyungmin Lee, Suwon-si (KR); Cheonyong Lim, Suwon-si (KR); Jinsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 18/140,334

(22) Filed: Apr. 27, 2023

(65) Prior Publication Data

US 2023/0261521 A1 Aug. 17, 2023

Related U.S. Application Data

(63) Continuation of application No. PCT/KR2021/013811, filed on Oct. 7, 2021.

(30) Foreign Application Priority Data

Dec. 2, 2020 (KR) .......................... 10-2020-0166406

(51) Int. Cl.
*H02J 50/90* (2016.01)
*H01F 38/14* (2006.01)
(Continued)

(52) U.S. Cl.
CPC .............. *H02J 50/90* (2016.02); *H01F 38/14* (2013.01); *H02J 50/10* (2016.02); *H02J 50/402* (2020.01);
(Continued)

(58) Field of Classification Search
CPC ......... H02J 50/10–12; H02J 50/40–402; H02J 50/80; H02J 50/90; H05B 6/02–44; H05B 2213/05; H05B 2213/06
See application file for complete search history.

(56) References Cited

U.S. PATENT DOCUMENTS

2009/0033280 A1 2/2009 Choi et al.
2009/0224810 A1* 9/2009 Bergman .................. G06F 1/08
327/162

(Continued)

FOREIGN PATENT DOCUMENTS

CN 104124768 A 10/2014
JP 2011-199975 A 10/2011
(Continued)

OTHER PUBLICATIONS

English machine translation of CN104124768A published Oct. 29, 2014 (Year: 2014).*

(Continued)

*Primary Examiner* — Rexford N Barnie
*Assistant Examiner* — David A Shiao
(74) *Attorney, Agent, or Firm* — Sughrue Mion, PLLC

(57) ABSTRACT

A wireless power transmission device includes power transmission coils for transmitting power to a wireless power reception device; inverters for applying alternating current power to the coils; a communication module using a frequency different from that of the power transmitted from the coils; and a processor. The processor controls the inverters such that first power is sequentially applied to the coils (Continued)

respectively, receives a communication signal from the reception device through the communication module while the first power is being sequentially applied, identifies a first coil corresponding to a position of the reception device based on of a reception time point of the communication signal and time points at which the first power starts to be applied to the coils, and controls a first inverter corresponding to the first coil such that second power for charging the reception device is applied to the first coil.

13 Claims, 14 Drawing Sheets

(51) Int. Cl.
  *H02J 50/10* (2016.01)
  *H02J 50/40* (2016.01)
  *H02J 50/80* (2016.01)
  *H05B 6/12* (2006.01)

(52) U.S. Cl.
  CPC ............ *H02J 50/80* (2016.02); *H05B 6/1236* (2013.01); *H02J 50/40* (2016.02); *H05B 2213/05* (2013.01); *H05B 2213/06* (2013.01)

(56) References Cited

U.S. PATENT DOCUMENTS

| | | |
|---|---|---|
| 2011/0025133 A1 | 2/2011 | Sauerlaender et al. |
| 2014/0361738 A1* | 12/2014 | Lee .................... H02J 50/80 320/108 |
| 2017/0155284 A1* | 6/2017 | Takahashi ............... H02J 50/80 |
| 2018/0131219 A1 | 5/2018 | Kim et al. |
| 2018/0278099 A1* | 9/2018 | Hong ...................... H02J 50/90 |
| 2019/0104569 A1 | 4/2019 | Moon et al. |
| 2020/0076242 A1 | 3/2020 | Narayana Bhat et al. |
| 2020/0196399 A1* | 6/2020 | Egenter .................. H05B 6/065 |
| 2020/0212720 A1* | 7/2020 | Lee ......................... H01F 27/36 |
| 2020/0244108 A1 | 7/2020 | Kim et al. |
| 2023/0074976 A1* | 3/2023 | Nakanishi ............. H02J 50/005 |

FOREIGN PATENT DOCUMENTS

| | | |
|---|---|---|
| KR | 10-2007-0078889 A | 8/2007 |
| KR | 10-2011-0076609 A | 4/2011 |
| KR | 10-2016-0040354 A | 4/2016 |
| KR | 10-2018-0051256 A | 5/2018 |
| KR | 10-2019-0038170 A | 4/2019 |
| KR | 10-2019-0123658 A | 11/2019 |
| KR | 10-2096203 B1 | 4/2020 |
| KR | 10-2155807 B1 | 9/2020 |

OTHER PUBLICATIONS

International Search Report (PCT/ISA/210) issued Jan. 11, 2022 by the International Searching Authority in counterpart International Patent Application No. PCT/KR2021/013811.

Written Opinion (PCT/ISA/237) issued Jan. 11, 2022 by the International Searching Authority in counterpart International Patent Application No. PCT/KR2021/013811.

Communication dated Feb. 23, 2025, issued by the Korean Patent Office in Korean Application No. 10-2020-0166406.

* cited by examiner

ELECTRONIC DEVICE FOR TRANSMITTING WIRELESS POWER HAVING A PLURALITY OF POWER TRANSMISSION COILS AND OPERATING METHOD THEREFOR TO IDENTIFY POSITION OF A WIRELESS POWER RECEPTION DEVICE

CROSS-REFERENCE TO RELATED APPLICATIONS

This application is a bypass continuation application of International Patent Application No. PCT/KR2021/013811, filed on Oct. 7, 2021, which is based on and claims priority to Korean Patent Application No. 10-2020-0166406, filed on Dec. 2, 2020 in the Korean Intellectual Property Office, the disclosures of each of which are incorporated by reference herein in their entireties.

BACKGROUND

1. Field

The disclosure relates to an electronic device for transmitting wireless power and an operation method therefor, and more particularly, to the identification of which of a plurality of power transmission coils to supply power in order to transmit to a receiving device.

2. Description of Related Art

Induction cooktops capable of reducing indoor air pollution and indoor temperature increase without discharging an exhaust gas are widely used.

Recently, the Wireless Power Consortium established a wireless power standard for kitchen appliances (Ki Cordless Kitchen (hereafter referred to as Ki standard)) and in a global standard induction system following the Ki standard, power is supplied by sensing or recognizing a target object based on near-field communication such as NFC.

An induction system may perform communication with an external electronic device. A current induction system may perform communication with an external electronic device by using near-field communication (NFC). However, relatively short usage distance (several cm) of the NFC may demand an NFC communication module for each coil included in the induction system and thus cause an increase in manufacturing cost. Accordingly, there is a demand for development of an induction system that supports communication other than NFC, detects an object existing on a wireless power transmission device, and determines whether the object is a power transmission target.

SUMMARY

An object of the disclosed device and operation method is to sequentially apply power to a plurality of power transmission coils and detect a power transmission coil to which an external electronic device is located, based on a power application time point and a reception time point of a communication signal received from the outside.

According to various embodiments, a wireless power transmission device may include a plurality of power transmission coils configured to transmit power to a wireless power reception device, a plurality of inverters configured to respectively apply alternating current power to a corresponding one of the plurality of power transmission coils, at least one communication module using a frequency different from that of the power transmitted from the plurality of power transmission coils, and at least one processor. The at least one processor may be configured to control the plurality of inverters such that first power is sequentially applied to the plurality of power transmission coils, receive a first communication signal from the wireless power reception device through the at least one communication module while the first power is sequentially applied to the plurality of power transmission coils, identify a first power transmission coil, of the plurality of power transmission coils, as corresponding to a position of the wireless power reception device, based on a reception time point of the first communication signal and at least one time point at which the first power starts to be applied to a corresponding one of the plurality of power transmission coils, and control a first inverter, of the plurality of inverters, corresponding to the first power transmission coil, such that second power for charging the wireless power reception device is applied to the first power transmission coil.

According to various embodiments, an operation method of a wireless power transmission device may include a process of controlling a plurality of inverters of the wireless power transmission device corresponding to one of a plurality of power transmission coils of the wireless power transmission device respectively, to sequentially apply first power to the plurality of power transmission coils of the wireless power transmission device, a process of receiving a communication signal from a wireless power reception device through at least one communication module of the wireless power transmission device while the first power is sequentially applied to the plurality of power transmission coils, a process of identifying a first power transmission coil, of the plurality of power transmission coils, as corresponding to a position of the wireless power reception device, based on a reception time point of the first communication signal and at least one time point at which the first power starts to be applied to a corresponding one of the plurality of power transmission coils, and a process of controlling a first inverter, of the plurality of inverters, corresponding to the first power transmission coil, such that second power for charging the wireless power reception device is applied to the first power transmission coil.

Various embodiments such as described above may provide an electronic device and an operation method thereof which may sequentially apply power to a plurality of power transmission coils and detect a power transmission coil corresponding to a position in which an external device is disposed, based on a power application time point and a reception time point of a communication signal received from the outside.

Therefore, cross-connection between the power transmission coil of the wireless power transmission device and the external device may be prevented.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1A:
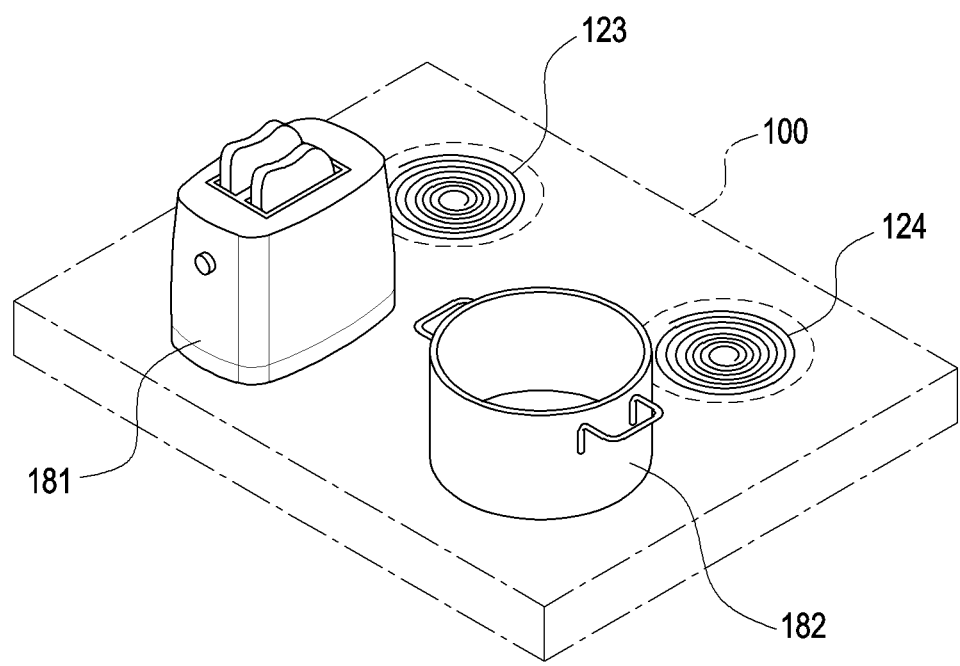
FIGS. 1A and 1B are views illustrating an exemplary environment in which an electronic device is used.
Figure 1B:
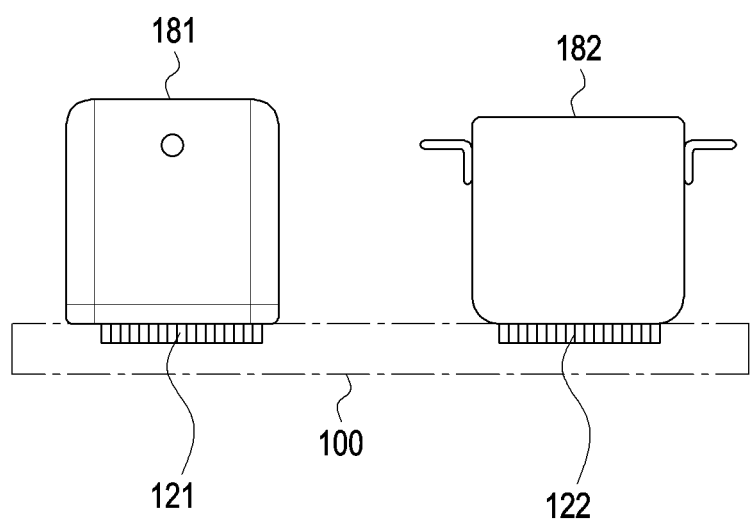

FIG. 1A and FIG. 1B are views illustrating an exemplary environment in which an electronic device is used according to an embodiment.

Referring to FIG. 1A and FIG. 1B, according to an embodiment, a wireless power transmission system may include an electronic device 100. There is no limitation to a type of the electronic device 100, but for convenience of description, the electronic device 100 capable of functioning as an induction cooktop will be described as an example. The electronic device 100 may include a plurality of coils 121, 122, 123, and 124 corresponding to positions in which an external electronic device 181 or a cooking vessel 182 may be located. Although FIG. 1A shows, as an example, an electronic device 100 including a total of four coils including a coil 121 corresponding to a position of the external electronic device 181, and a coil 122 corresponding to a position of the cooking vessel 182, and two other coils 123 and 124, the number of coils included in the electronic device 100 is not limited thereto. The plurality of coils 121, 122, 123, and 124 need not be arranged on a surface of the electronic device 100 and may instead, for example, be arranged under the surface of the electronic device 100 on which the external electronic device 181 or the cooking vessel 182 may be mounted. Accordingly, if the cooking vessel 182 is mounted on the electronic device 100, the cooking vessel 182 might not be in contact with the coil 122.

According to an embodiment, the cooking vessel 182 may be located on the surface of the electronic device 100 corresponding to a position of the coil 122. The cooking vessel 182 may be a vessel configured to receive food while the food is heated. The cooking vessel 182 may include, for example, a pot, a pan, a wok, a skillet, or a kettle, but has no limitation to types thereof. The cooking vessel 182 may include a magnetic material which may be heated by the electronic device 100.

According to an embodiment, the electronic device 100 may apply a current (e.g., an alternating current) having a size changed on a time dependence manner to the coils 121, 122, 123, and 124. As a current is applied to the coils 121, 122, 123, and 124, a magnetic field may be formed around the coils 121, 122, 123, and 124. As a current applied to the coils 121, 122, 123, and 124 is changed, a magnetic field formed by the coils 121, 122, 123, and 124 may be change. An eddy current according to magnetic field change may flow on a surface of the cooking vessel 182 in contact with the electronic device 100 and the cooking vessel 182 may be heated by the eddy current. A process in which the cooking vessel 182 is heated by the eddy current flowing on the surface of the cooking vessel 182 may be expressed that the cooking vessel 182 wirelessly receives power.

The electronic device 100 may transmit power according to a resonance method or an induction method. The electronic device 100 may be configured to perform wireless power transmission based on one of the resonance method or the induction method. Alternatively, the electronic device 100 may be configured to support both the resonance method and the induction method. The electronic device 100 may apply a current (e.g., an alternating current) to the coil 121, 122, 123, or 124 according to the resonance method and/or the induction method. A process in which the electronic device 100 generates an induced magnetic field through a coil may be described as the electronic device 100 wirelessly transmitting power.

According to an embodiment, the external electronic device 181 may be located on the surface of the electronic device 100 corresponding to a position of the coil 121 and perform wireless charging. The external electronic device 181 may include a coil on which induced electromotive force is generated by a magnetic field formed therearound and time-dependently changed in size. A process in which, as the induced electromotive force is generated on the coil of the external electronic device 181, an alternating current may be output from the coil or applied to a coil may be described as the external electronic device 181 wirelessly receiving power. The external electronic device 181 may process (e.g., rectifies or converts (or regulates)) power from the included coil to be transferred to a load (e.g., a battery or a charger for charging a battery) of the external electronic device 181. The external electronic device 181 may include, for example, an electric kettle, a toaster, or a blender. In addition, the external electronic device 181 may include a mobile device without limitation to a type thereof.

According to various embodiments, the electronic device 100 may perform communication with the external electronic device 181. For example, the electronic device 100 may perform communication with the external electronic device 181 according to an out-band method. The electronic device 100 or the external electronic device 181 may transmit or receive data by using a communication circuit (e.g., a Bluetooth Low Energy (BLE) communication module) provided separately from the coil. According to implementation, various suitable communication circuits (e.g., a BLE communication module, a Wi-Fi communication module, and Wi-gig module), individually or in combination, may transmit or receive wireless power transmission control signals, respectively.

Figure 2:
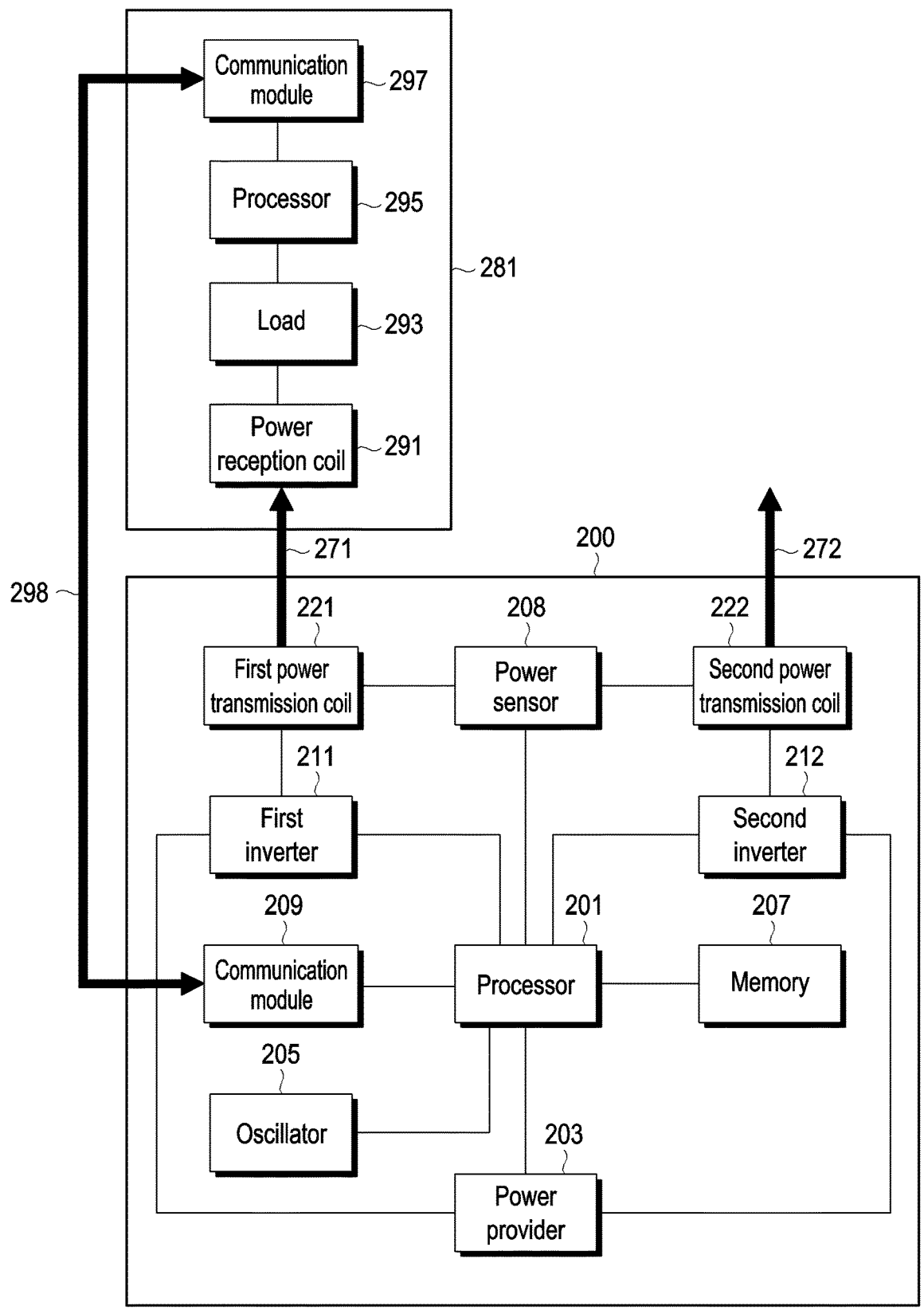
FIG. 2 is a block diagram illustrating a wireless power reception device and a wireless power transmission device included in a wireless power transmission system according to an embodiment.

FIG. 2 is a block diagram of a wireless power reception device and a wireless power transmission device included in a wireless power transmission system according to an embodiment.

Referring to FIG. 2, the wireless power transmission system may include a wireless power transmission device 200. The wireless power transmission system may include a wireless power reception device 281 configured to wirelessly receive power from the wireless power transmission device 200. The wireless power transmission device 200 may correspond to the electronic device 100 in FIG. 1A. The wireless power reception device 281 may correspond to the external electronic device 181 in FIG. 1A.

According to an embodiment, the wireless power transmission device 200 may include a processor 201, a power provider 203, an oscillator 205, a memory 207, a power sensor 208, a communication module 209, a plurality of inverters including a first inverter 211 and a second inverter 212, and a plurality of power transmission coils including a first power transmission coil 221 and a second power transmission coil 222.

Much as in FIGS. 1A and 1B, the number of coils and inverters is not limited to the number illustrated in FIG. 2. However, for ease of description and illustration, two inverters and two power transmission coils will be assumed hereinafter.

According to an embodiment, the power provider 203 may provide DC power to the first inverter 211 and/or the second inverter 212. In this case, the provision of DC power may be understood as at least one of application of a DC voltage or application of a DC current. The power provider 203 may receive power from at least one of a DC current power source, or an AC current power source and output DC power. The power provider 203 may be controlled by the processor 201 and the processor 201 may control the power provider 203 to provide power to the first inverter 211 and/or the second inverter 212 based on a configured output level.

According to an embodiment, the first inverter 211 or the second inverter 212 may output AC power by using the DC power received from the power provider 203. In this case, the provision of AC power may be understood as at least one of application of an AC voltage or application of an AC current. The first inverter 211 may provide AC power to the first power transmission coil 221. The second inverter 212 may provide AC power to the second power transmission coil 222. The first inverter 211 and the second inverter 212 may be controlled by the processor 201 and the processor 201 may respectively control the first inverter 211 or the second inverter 212 to provide power to the power transmission coil 221 or the second power transmission coil 222 based on a configured output level. The first inverter 211 and the second inverter 212 may control at least one of an output pulse width, a duty cycle, or a power level. Alternatively, the processor 201 may control an output level from the power provider 203.

According to an embodiment, the first power transmission coil 221 and the second power transmission coil 222 may wirelessly transmit power 271 and 272 to the outside by using AC power received from each of the first inverter 211 and the second inverter 212. Here, the wireless transmission of power may be understood as a process by which the wireless power transmission device 200 applies a current to the first power transmission coil 221 and/or the second power transmission coil 222 such that an induced magnetic field is generated from the first power transmission coil 221 and/or the second power transmission coil 222.

According to an embodiment, the power sensor 208 may perform sensing with respect to at least one of a voltage, a current, power, or an impedance applied to the first power transmission coil 221 and/or the second power transmission coil 222. The power sensor 208 may measure load change (or impedance change) based on size change of a current, a voltage, or power of the first power transmission coil 221 and/or the second power transmission coil 222. For example, the power sensor 208 may sequentially or separately perform sensing with respect to the first power transmission coil 221 and/or the second power transmission coil 222. For another example, the power sensor 208 may at least concurrently perform sensing with respect to the first power transmission coil 221 and/or the second power transmission coil 222.

According to an embodiment, the processor 201 may be implemented as a microprocessor or a micro controlling unit (MCU), or may be implemented as a field programmable gate array or a set of analog elements, without limitation thereto. The processor 201 may transfer an electrical signal to other components of the wireless power transmission device 200 or receive an electrical signal from other components. Herein, performing of an operation by the wireless power transmission device 200 or the processor 201 through other components of the wireless power transmission device 200 may mean that the processor 201 transfers an electrical signal to other components so as to acquire a result of a corresponding operation performed or the processor 201 receives, from other components, an electrical signal generated as a result of a corresponding operation performed.

According to an embodiment, the memory 207 may load a command or data received from other components (e.g., the power sensor 208 or the communication module 209) and store result data by the processor 201.

According to an embodiment, the communication module 209 may perform various communication with other entities. The communication module 209 may be controlled by the processor 201 and may perform communication 298 with the communication module 297 of the wireless power reception device 281 according to an out-band method. For example, the processor 201 may receive a communication signal (e.g., an advertisement signal) for advertisement of the wireless power reception device 281, by using the communication module 209.

Although not shown in FIG. 2, according to an embodiment, the wireless power transmission device 200 may further include an input device configured to receive a command or data from the outside (e.g., a user) of the wireless power transmission device 200. For example, the input device may include at least one of a keyboard configured to receive a specific temperature, a button or touch input device configured to configure an output level.

According to an embodiment, the oscillator 205 may generate a clock signal. For example, the oscillator 205 may provide a generated clock signal to the processor 201. The processor 201 may control, by using a clock signal received from the oscillator 205, the first inverter 211 and/or the second inverter 212 to apply power for detection to the first power transmission coil 221 and/or the second power transmission coil 222. For example, the processor 201 may control, based on a clock signal, the first inverter 211 and/or the second inverter 212 to sequentially apply power for detection to the first power transmission coil 221 and/or the second power transmission coil 222. For example, the processor 201 may control, based on a clock signal, the first inverter 211 and/or the second inverter 212 to apply power for charging or heating to the first power transmission coil 221 and/or the second power transmission coil 222.

According to an embodiment, the wireless power reception device 281 may include a processor 295, a communication module 297, a power reception coil 291, and a load 293.

According to an embodiment, the power reception coil 291 may receive wireless power from one of the plurality of coils 221 and 222 of the wireless power transmission device 200. For example, responsive to the wireless power reception device 281 being disposed on a position corresponding to a first power transmission coil 221 of the wireless power transmission device 200, the power reception coil 291 may receive wirelessly transmitted power 271 from the first power transmission coil 221. Responsive to the wireless power reception device 281 not being disposed on a position corresponding to a second power transmission coil 222 of the wireless power transmission device 200, the power reception coil 291 may fail to receive wirelessly transmitted power 272 from the second power transmission coil 222. For example, if a quantity of the wirelessly transmitted power 272 received by the power reception coil 291 from the second power transmission coil 222 is smaller than a predetermined quantity, it may be understood that the power reception coil 291 has not received the wirelessly transmitted power 272 from the second power transmission coil 222.

According to an embodiment, the wireless power reception device 281 may process power from the power reception coil 291 and transfer the power to the load 293. To this end, the wireless power reception device 281 may include a rectifier (not shown) and/or a DC-DC converter (not shown).

According to an embodiment, the load 293 may include a battery (not shown) and a charger (not shown) configured to charge the battery. Furthermore, the load 293 may include a power management integrated circuit (PMIC) (not shown). The load 293 may receive the power which has been processed by the power reception coil 291.

According to an embodiment, the processor 295 of the wireless power reception device 281 may be understood similarly to the processor 201 of the wireless power transmission device 200 and thus a description of the processor 295 is replaced with the description of the processor 201.

According to an embodiment, the communication module 297 may perform various communication with other entities. The communication module 297 may be controlled by the processor 295 and may perform communication with the communication module 209 of the wireless power transmission device 200 according to an out-band method. The wireless power reception device 281 may receive power capable of performing communication from the wireless power transmission device 200, wake up the processor 201 and/or the communication module 297 by using a corresponding power, and broadcast a communication signal (e.g., an advertisement signal) for advertisement by using the communication module 297. The communication module 209 of the wireless power transmission device 200 may receive a communication signal broadcasted from the communication module 297 of the wireless power reception device 281.

Figure 3:
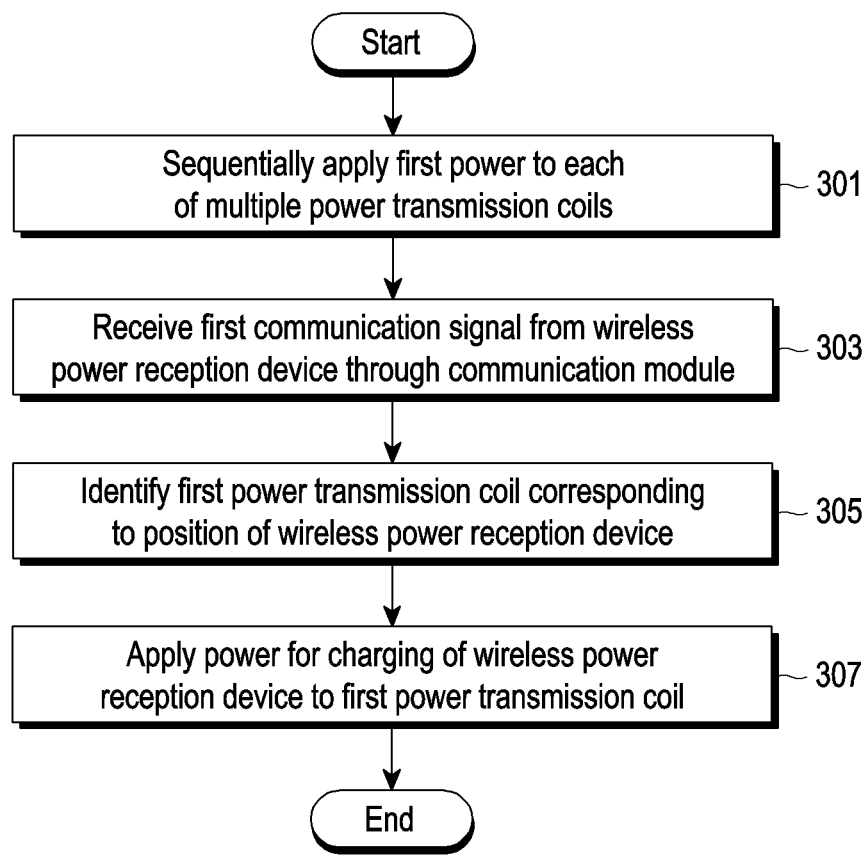
FIG. 3 is a flowchart illustrating an operation method of a wireless power transmission device according to an embodiment.

FIG. 3 is a flowchart illustrating an operation method of a wireless power transmission device according to an embodiment. FIG. 3 will be described with reference to FIG. 2.

Referring to FIG. 3, according to an embodiment, in operation 301, the wireless power transmission device 200 (e.g., the processor 201) may sequentially apply first power to each of the plurality of coils 221 and 222. The first power may be power for detecting an external device and will be described below. The wireless power transmission device 200 may respectively control the first inverter 211 and the second inverter 212 to sequentially apply the first power to the first power transmission coil 221 and the second power transmission coil 222. Sequential application of detection power may mean that an application start time of detection power is sequentially configured for each power transmission coil. For example, the processor 201 may control so that detection power is applied to the first power transmission coil 221 and after the application is completed, detection power is applied to the second power transmission coil 222. Alternatively, the processor 201 may apply detection power to the first power transmission coil 221 and then, before the application thereat is completed, start to apply detection power to the second power transmission coil 222. Various methods for applying detection power will be described below.

In operation 303, according to an embodiment, the wireless power transmission device 200 may receive a first communication signal from the wireless power reception device 281 through the communication module 209. The first communication signal may be a communication signal transmitted from the wireless power reception device 281 while the first power is sequentially applied to each of the plurality of coils 221 and 222 of the wireless power transmission device 200. The wireless power reception device 281 may be configured to receive detection power to wake up the communication module 297 and broadcast a communication signal by using communication module 297. For example, if the wireless power reception device 281 is located on the first power transmission coil 221, a communication signal may be detected from the wireless power reception device 281 while the first power is applied to the first power transmission coil 221, and if the wireless power reception device 281 is located on the second power transmission coil 222, a communication signal may be detected from the wireless power reception device 281 while the first power is applied to the second power transmission coil 222.

In operation 305, according to an embodiment, the wireless power transmission device 200 may identify the first power transmission coil 221 corresponding to a position of the wireless power reception device 281 based on a reception time point of the first communication signal and a starting time point of first power application with respect to each of the plurality of power transmission coils 221 and 222. For example, if the wireless power transmission device 200 receives the first communication signal from the wireless power reception device 281 after a first time point at which the first power is started to be applied to the first power transmission coil 221 and before a second time point at which the first power is started to be applied to the second power transmission coil 222, it may be determined that the wireless power reception device 281 is disposed on a position at which the first power transmission coil 221 is disposed. An operation of identifying the first power transmission coil 221 corresponding to a position of the wireless power reception device 281 or an operation of identifying that the wireless power reception device 281 is disposed on a position at which the first power transmission coil 221 is disposed may be understood as an operation of selecting the first power transmission coil 221 as a coil corresponding to a position of the wireless power reception device 281.

In operation 307, according to an embodiment, the wireless power transmission device 200 may control the first inverter 211 to apply second power for charging the wireless power reception device 281 to the first power transmission coil 221. The wireless power transmission device 200 may transfer wireless power to the wireless power reception device 281 by using the first power transmission coil 221 selected as a coil corresponding to a position of the wireless power reception device 281.

Figure 4:
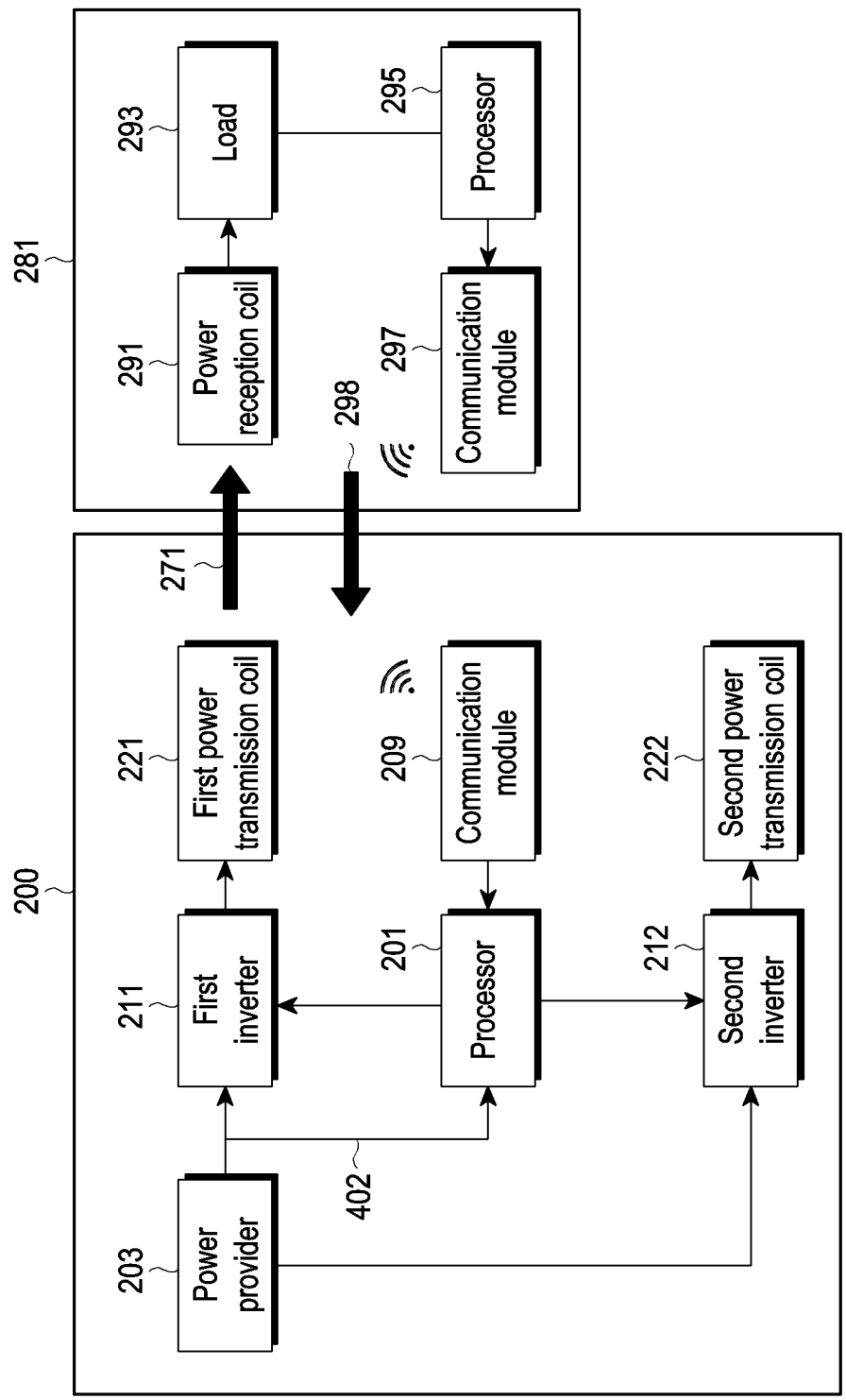
FIG. 4 is a block diagram illustrating interactions of a wireless power reception device and a wireless power transmission device included in a wireless power transmission system according to an embodiment.
Figure 5:
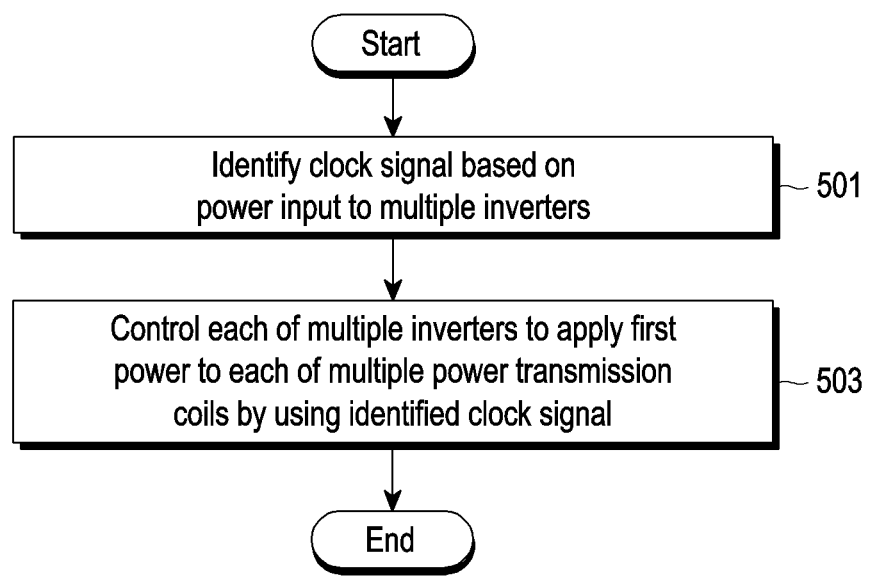
FIG. 5 is a flowchart illustrating a method of applying a detection power by a wireless power transmission device according to an embodiment.

FIG. 4 is a block diagram illustrating interactions of a wireless power reception device and a wireless power transmission device included in a wireless power transmission system according to an embodiment. FIG. 5 will be described with reference to FIG. 4. FIG. 5 is a flowchart illustrating an operation method of applying a detection power by a wireless power transmission device according to an embodiment.

Referring to FIG. 4, according to an embodiment, the power provider 203 of the wireless power transmission device 200 may provide DC power 402 to the first inverter 211 and/or the second inverter 212.

Referring to FIG. 5, in operation 501, according to an embodiment, the wireless power transmission device 200 (e.g., the processor 201) may identify a clock signal based on the DC power 402 provided to the first inverter 211 and/or the second inverter 212 from the power provider 203. The DC power provided to the plurality of inverters 211 and 212 from the power provider 203 may be DC power converted from AC power input to the power provider 203. For example, the power provider may convert AC power having a frequency of 60 Hz into DC power 402 and provide the DC power. However, the DC power 402 may include 120 Hz AC component in half-wave inverted form and thus the processor 201 and/or the inverters 211 and 212 may identify the corresponding AC component as a clock signal.

In operation 503, by using the identified clock signal, the wireless power transmission device 200 may respectively control the first inverter 211 and the second inverter 212 to sequentially apply the first power to the first power transmission coil 221 and the second power transmission coil 222.

FIG. 4 may be understood similarly to FIG. 2. Referring to FIG. 4, the wireless power reception device 281 may be disposed on a position at which the first power transmission coil 221 of the wireless power transmission device 200 is disposed. After the first power is sequentially applied to the first power transmission coil 221 and the second power transmission coil 222, according to the first power applied to the first power transmission coil 221, the wireless power reception device 281 may receive wirelessly transmitted power 271 from the power reception coil 291 and transmit a communication signal through the communication module 297 by using corresponding power.

Figure 6:
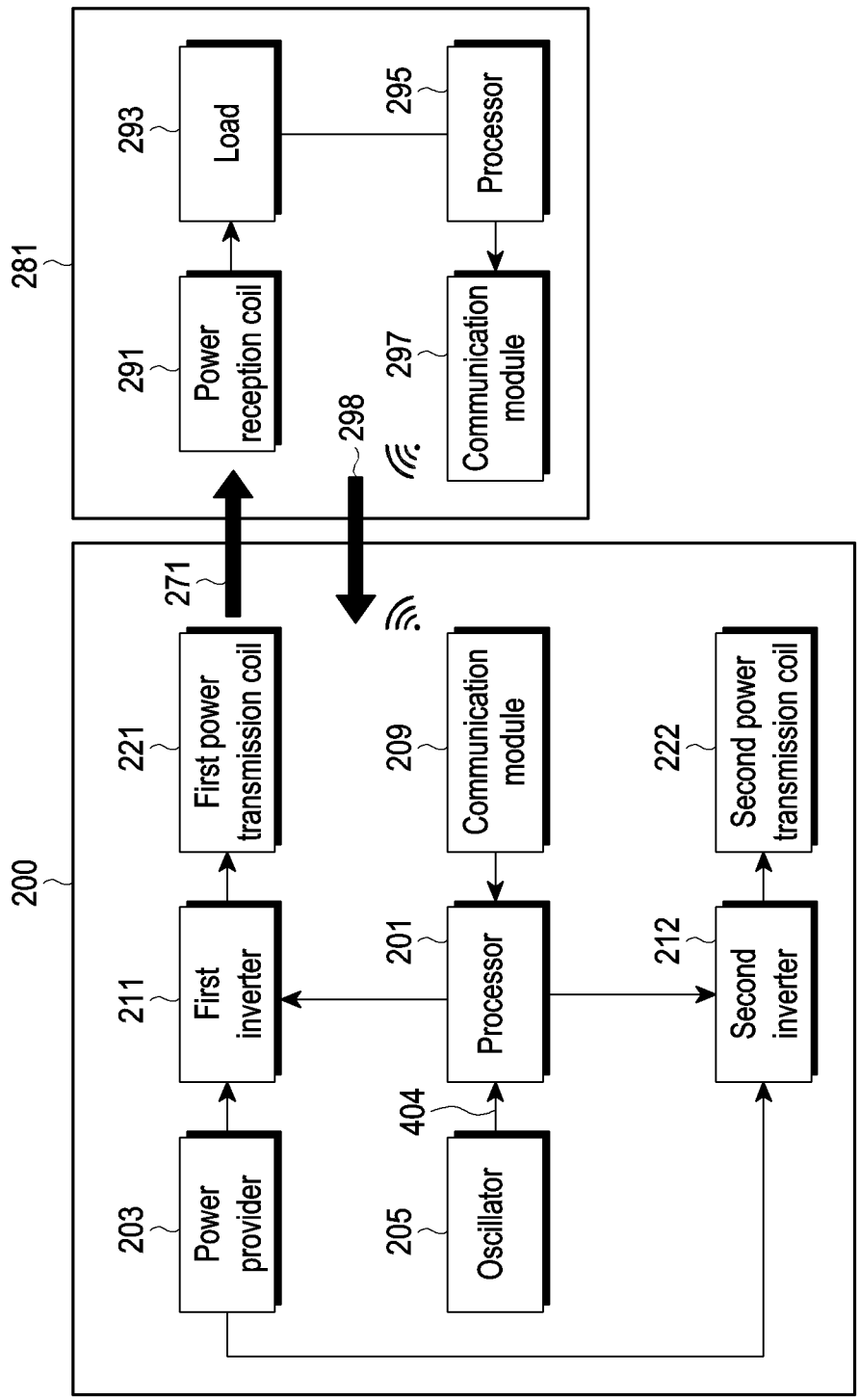
FIG. 6 is a block diagram illustrating interactions of a wireless power reception device and a wireless power transmission device included in a wireless power transmission system according to an embodiment.
Figure 7:
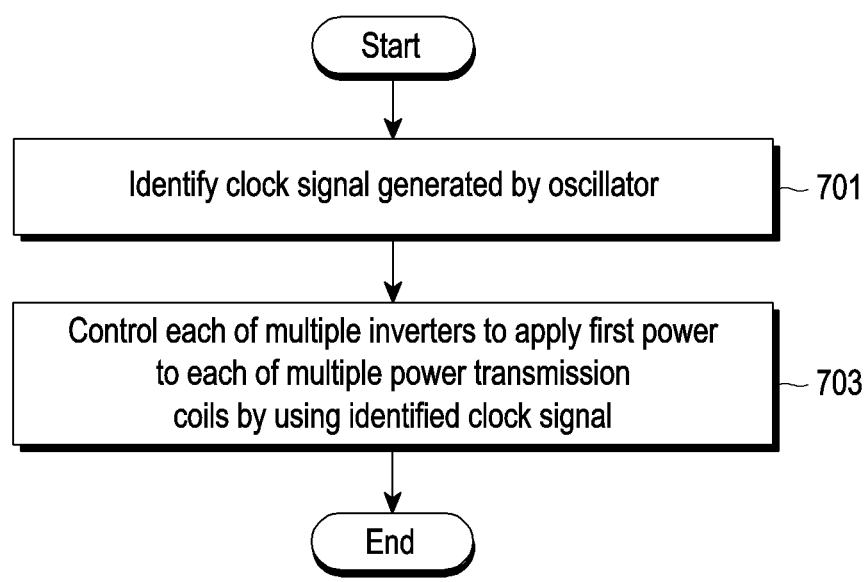
FIG. 7 is a flowchart illustrating a method of applying a detection power by a wireless power transmission device according to an embodiment.

FIG. 6 is a block diagram illustrating interactions of a wireless power reception device and a wireless power transmission device included in a wireless power transmission system according to an embodiment. FIG. 7 will be described with reference to FIG. 6. FIG. 7 is a flowchart illustrating a method of applying a detection power by a wireless power transmission device according to an embodiment.

Referring to FIG. 6, according to an embodiment, the oscillator 205 of the wireless power transmission device 200 may provide a clock signal 404 to the processor 201. The oscillator 205 may provide a clock signal 404 including a pulse having a frequency of 120 Hz; however, this is merely an example, and there is no limitation to the frequency.

Referring to FIG. 7, in operation 701, according to an embodiment, the wireless power transmission device 200 (e.g., the processor 201) may identify a clock signal 404 received from the oscillator 205.

In operation 703, by using the identified clock signal, the wireless power transmission device 200 may respectively control the first inverter 211 and the second inverter 212 to sequentially apply the first power to the first power transmission coil 221 and the second power transmission coil 222.

Power transmission and communication signal transmission between the wireless power transmission device 200 and the wireless power reception device 281 in FIG. 6 may be understood similarly to FIG. 2.

Figure 8:
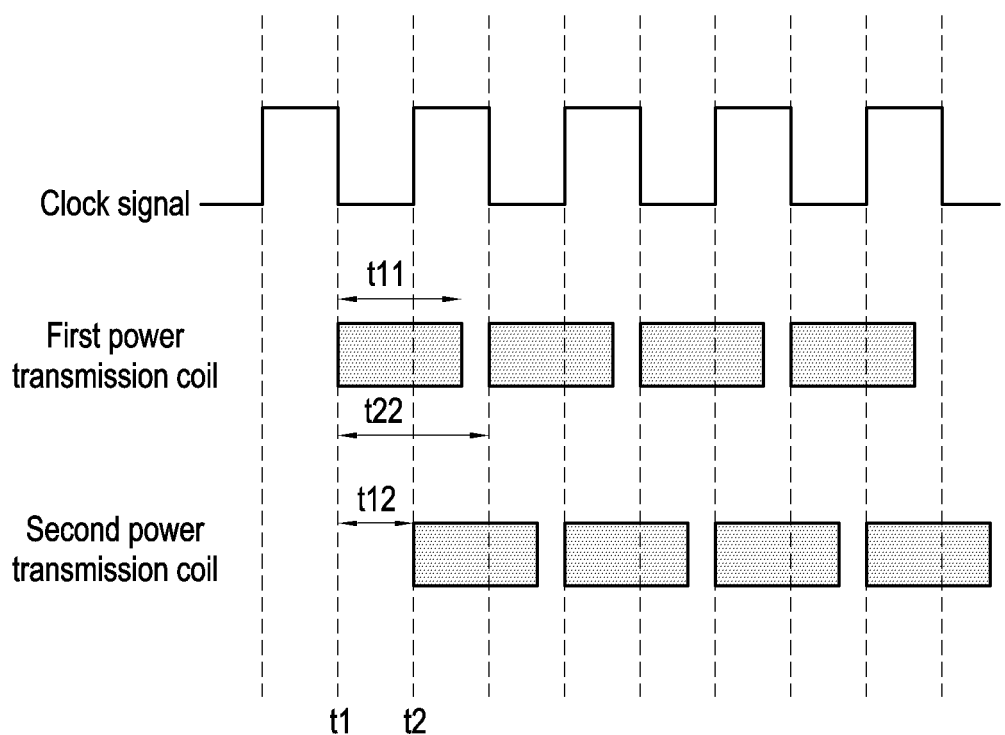
FIG. 8 is a timing diagram illustrating an example execution of a method of applying a detection power by a wireless power transmission device according to an embodiment.

FIG. 8 is a timing diagram illustrating an example execution of a method of applying a detection power by a wireless power transmission device according to an embodiment. FIG. 8 will be described with reference to FIG. 4 or FIG. 5.

Referring to FIG. 8, according to an embodiment, based on the identified clock signal, the wireless power transmission device 200 (e.g., the processor 201) may respectively control the first inverter 211 and the second inverter 212 to sequentially apply the first power to the first power transmission coil 221 and the second power transmission coil 222.

According to an embodiment, for example, based on receiving the first communication signal from the wireless power reception device 281 during a period in which the first power is applied to the first power transmission coil 221, the wireless power transmission device 200 may select the first power transmission coil 221 as a coil corresponding to the position of the wireless power reception device 281. For another example, based on receiving the first communication signal from the wireless power reception device 281 during a period in which the second power is applied to the second power transmission coil 222, the wireless power transmission device 200 may select the second power transmission coil 222 as a coil corresponding to the position of the wireless power reception device 281.

According to an embodiment, the first power may be applied during a first duration t11 and in a first cycle t22. For example, the wireless power transmission device 200 may control the first inverter 211 to apply the first power to the first power transmission coil 221 during a first duration t11 from a first time point t1. Thereafter, the wireless power transmission device 200 may control the first inverter 211 to reapply the first power to the first power transmission coil 221 after a first cycle t22 from a first time point t1. Furthermore, the wireless power transmission device 200 may control the second inverter 212 to apply the first power to the second power transmission coil 222 during a first duration t11 from a second time point t2. Thereafter, the wireless power transmission device 200 may control the second inverter 212 to reapply the first power to the second power transmission coil 222 after a first cycle t22 from a second time point t2. According to an embodiment, the first time point t1 and the second time point t2 may be different from each other. For example, the first time point t1 may be a time point before the second time point t2, and for another example, the second time point t2 may be a time point before the first time point t1. A time interval between the first time point t1 and the second time point t2 may correspond to a second duration t12.

Referring to FIG. 8, according to an embodiment, the second duration t12 may be a period shorter than the first duration t11. Accordingly, there may be a common period in which a period of applying the first power to the first power transmission coil 221 and a period of applying the first power to the second power transmission coil 222 overlap each other. For example, referring to FIG. 8, a period between t2 and t1+t11 may be a common period. Furthermore, referring to FIG. 8, a period between t1+t22 and t2+t11 may be another common period. However, FIG. 8 is not limiting, and a period between t1+t22 and t2+t11 might not be a common period, depending on a relative period difference between t11, t22, and t12. In an example case where t11=13 ms, t22=16 ms, and t12=8 ms, a period between t2 and t1+t11 and a period between t1+t22 and t2+t11 would each be a common period. In an example case where t11=8 ms, t22=16 ms, and t12=6 ms, a period between t2 and t1+t11 would be a common period but a period between t1+t22 and t2+t11 would not be a common period.

According to an embodiment, if there is a common period such as in FIG. 8, based on receiving the first communication signal from the wireless power reception device 281 during the common period, the wireless power transmission device 200 may select both the first power transmission coil 221 and the second power transmission coil 222 as coils corresponding to the position of the wireless power reception device 281. Alternatively, based on receiving the first communication signal from the wireless power reception device 281 during a common period, the wireless power transmission device 200 might not select a coil corresponding to the position of the wireless power reception device 281. However, as described below with reference to FIG. 12, even when receiving the first communication signal from the wireless power reception device 281 during the common period, the wireless power transmission device 200 may select one of the first power transmission coil 221 or the second power transmission coil 222 as a coil corresponding to the position of the wireless power reception device 281 by performing an additional operation.

Figure 9:
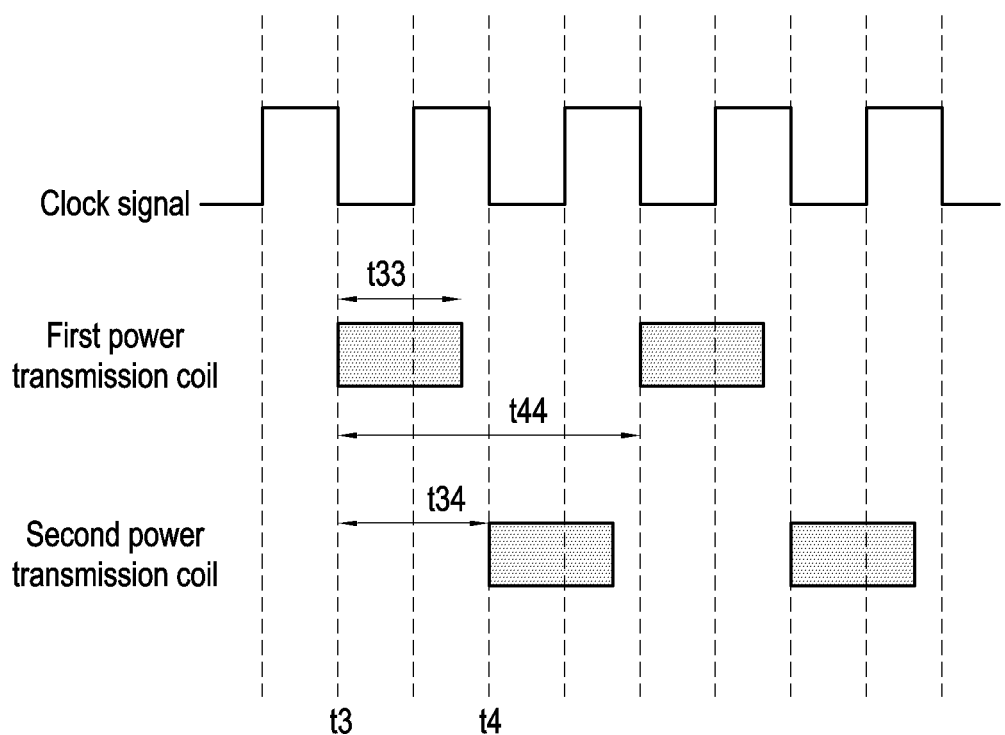
FIG. 9 is a timing diagram illustrating an example execution of a method of applying a detection power by a wireless power transmission device according to an embodiment.

FIG. 9 is a timing diagram illustrating an example execution of a method of applying a detection power by a wireless power transmission device according to an embodiment. FIG. 9 will be described with reference to FIG. 8.

Referring to FIG. 9, the first power may be applied during a third duration t33 and in a second cycle t44. According to an embodiment, a fourth duration t34 which is a time interval between a third time point t3 at which the first power is applied to the first power transmission coil 221 and a fourth time point t4 at which the first power is applied to the second power transmission coil 222 may be longer than the third duration t33 of the first power and the second cycle t44 may be longer than a sum of the third duration t33 and the fourth duration t34. Accordingly, there may be no common period in which a period of applying the first power to the first power transmission coil 221 and a period of applying the first power to the second power transmission coil 222 overlap each other.

According to an embodiment, when there is no common period, such as in FIG. 9, based on receiving the first communication signal from the wireless power reception device 281, the wireless power transmission device 200 may select one of the first power transmission coil 221 or the second power transmission coil 222 as a coil corresponding to the position of the wireless power reception device 281.

Figure 10:
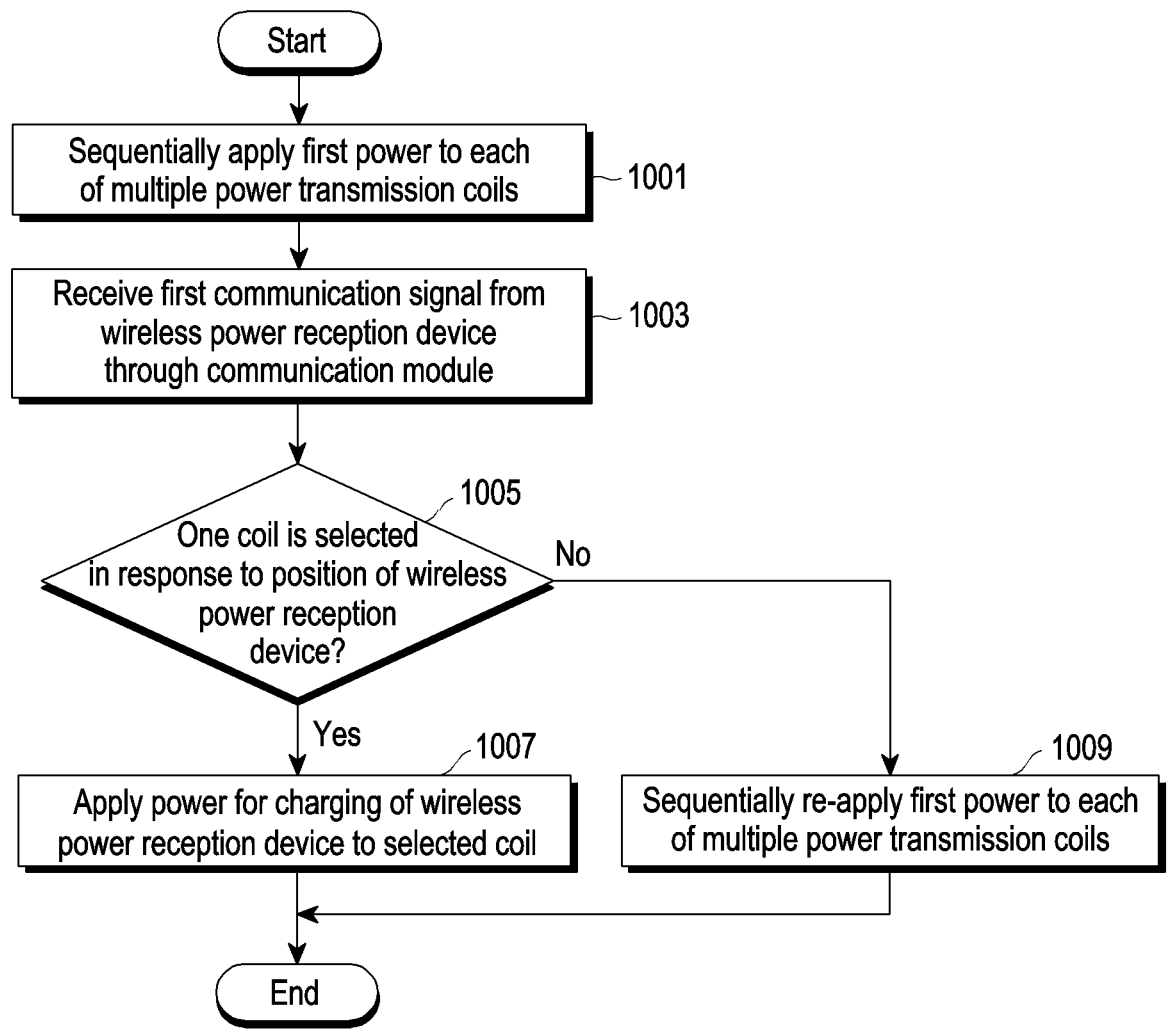
FIG. 10 is a flowchart illustrating an operation method of a wireless power transmission device according to an embodiment.
Figure 11:
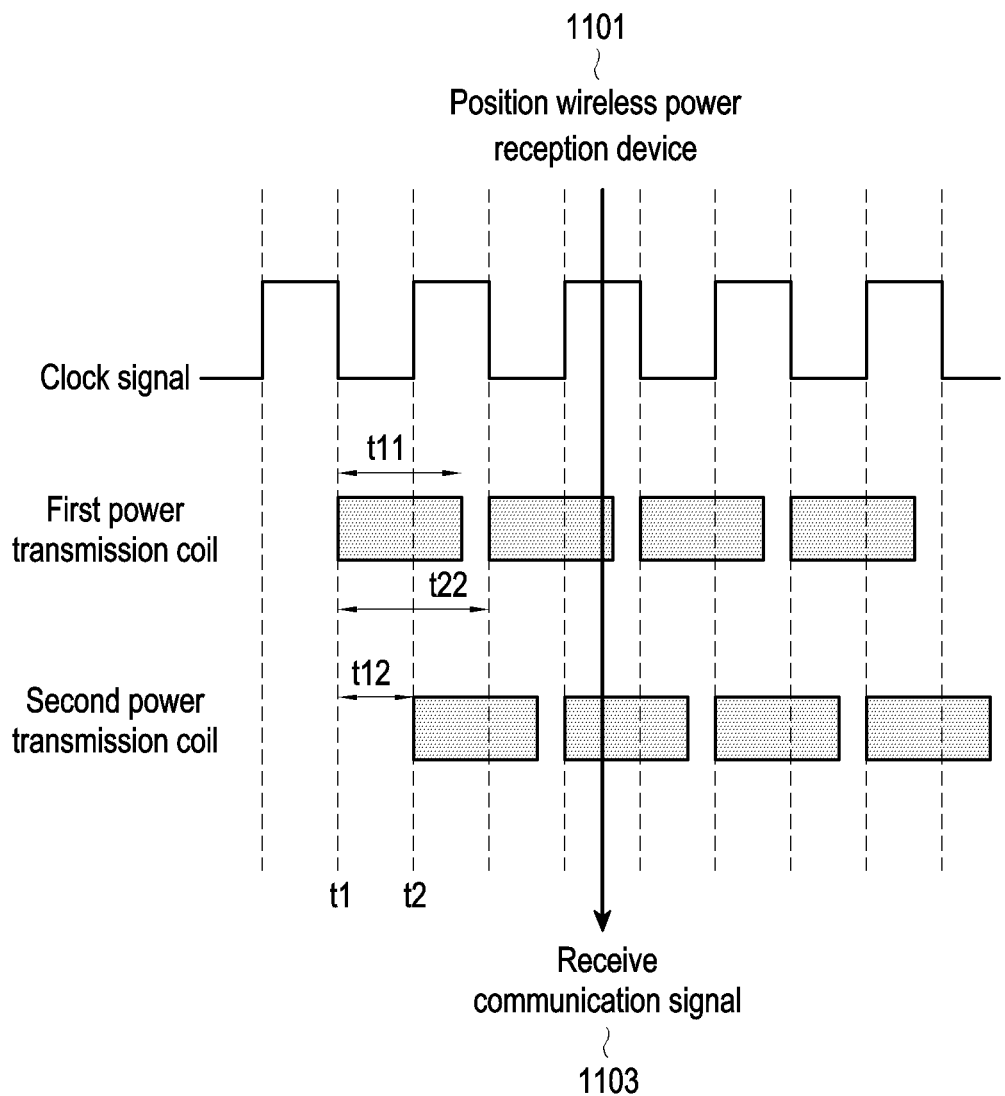
FIG. 11 is a timing diagram illustrating an example execution of an operation method of a wireless power transmission device according to an embodiment.

FIG. 10 is a flowchart for an operation method of a wireless power transmission device according to an embodiment. FIG. 10 will be described with reference to FIG. 8, FIG. 9, and FIG. 11. FIG. 11 is a timing diagram illustrating an example execution of an operation method of a wireless power transmission device according to an embodiment.

Referring to FIG. 11, according to an embodiment, in operation 1101, the wireless power reception device 281 may be positioned on the first power transmission coil 221 or the second power transmission coil 222. Accordingly, in operation 1103, the wireless power transmission device 200 may receive a first communication signal from the wireless power reception device 281 in a common period (e.g., a period between t2+t22 and t1+t11+t22). Based on receiving the first communication signal from the wireless power reception device 281 during the common period, the wireless power transmission device 200 may select both the first power transmission coil 221 and the second power transmission coil 222 as coils corresponding to the position of the wireless power reception device 281, or may select no coil corresponding to the position of the wireless power reception device 281.

Referring to FIG. 9, based on receiving the first communication signal from the wireless power reception device 281 during a period (e.g., a period between t3+t33 and t4) in which the first power is applied to neither the first power transmission coil 221 nor the second power transmission coil 222, the wireless power transmission device 200 may select no coil corresponding to the position of the wireless power reception device 281. According to another embodiment, even when receiving the first communication signal from the wireless power reception device 281 during a period (e.g., a period between t3+t33 and t4) in which the first power is applied to neither the first power transmission coil 221 nor the second power transmission coil 222, based on receiving the first communication signal between a third time point t3 at which the first power is applied to the first power transmission coil 221 and a fourth time point t4 at which the first power is applied to the second power transmission coil 222, the wireless power transmission device 200 may select the first power transmission coil 221 as a coil corresponding to the position of the wireless power reception device 281.

Referring to FIG. 9, according to an embodiment, the wireless power transmission device 200 may receive the first communication signal from the wireless power reception device 281 during a period (e.g., a period between t3 and t3+t33) in which the first power is applied to the first power transmission coil 221. In this case, as described above, the wireless power transmission device 200 may select the first power transmission coil 221 as a coil corresponding to the position of the wireless power reception device 281. In another example, if it is determined that a time interval between the third time point t3 at which the first power is applied to the first power transmission coil 221 and a reception time point at which the first communication signal is received from the wireless power reception device 281 is smaller than a predetermined reference value (e.g., 1 ms), the wireless power transmission device 200 may select the first power transmission coil 221 as a coil corresponding to the position of the wireless power reception device 281. In this case, even if the first communication signal is received from the wireless power reception device 281 during a period (e.g., a period between t3 and t3+t33) in which the first power is applied to the first power transmission coil 221, if it is determined that a time interval between the third time point at which the first power is applied to the first power transmission coil 221 and a reception time point at which the first communication signal is received from the wireless power reception device 281 exceeds the predetermined reference value, the wireless power transmission device 200 may select no coil corresponding to the position of the wireless power reception device 281.

Referring to FIG. 10, according to an embodiment, in operation 1001, the wireless power transmission device 200 (e.g., the processor 201) may respectively control the first inverter 211 and the second inverter 212 to sequentially apply first power to each of the plurality of coils 221 and 222.

In operation 1003, according to an embodiment, the wireless power transmission device 200 may receive the first communication signal from the wireless power reception device 281 through the communication module.

In operation 1005, according to an embodiment, the wireless power transmission device 200 may select, in response to the position of the wireless power reception device 281, one of the plurality of power transmission coils 221 and 222, select a plurality of coils, or select no coil. If the wireless power transmission device 200 selects, in response to the position of the wireless power reception device 281, one coil (1005—Yes), operation 1007 may be performed. If the wireless power transmission device 200 selects, in response to the position of the wireless power reception device 281, more than one coil or no coil (1005—No), operation 1009 may be performed.

In operation 1007, according to an embodiment, the wireless power transmission device 200 may control an inverter (e.g., the first inverter 211) to apply power for charging the wireless power reception device 281 to the selected coil (e.g., the first power transmission coil 221).

In operation 1009, according to an embodiment, the wireless power transmission device 200 may respectively control a plurality of inverters 211 and 212 corresponding to the plurality of power transmission coils 221 and 222 so as to sequentially re-apply the first power to each of the plurality of power transmission coils 221 and 222. In this case, a communication signal may be received from the wireless power reception device 281 at a time point corresponding to a time point at which the first power is applied to the first power transmission coil 221 and the wireless power transmission device 200 may select the first power transmission coil 221.

Figure 12:
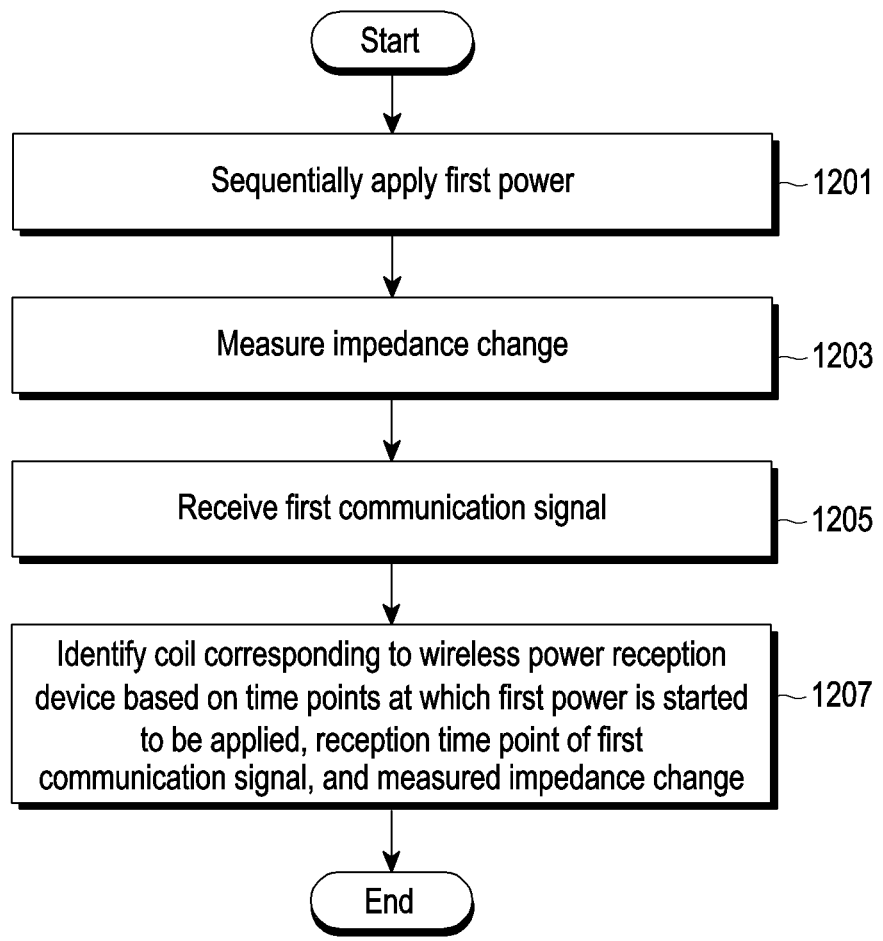
FIG. 12 is a flowchart illustrating an operation method of a wireless power transmission device according to an embodiment.

FIG. 12 is a flowchart illustrating an operation method of a wireless power transmission device according to an embodiment. FIG. 12 will be described with reference to FIG. 2.

Referring to FIG. 12, according to an embodiment, in operation 1201, the wireless power transmission device 200 (e.g., the processor 201) may respectively control a plurality of inverters 211 and 212 to sequentially apply first power to each of the plurality of coils 221 and 222.

In operation 1203, according to an embodiment, the wireless power transmission device 200 may identify first impedance change with respect to the first power transmission coil 221 based on a result measured by the power sensor 208 while the first power is applied to the first power transmission coil 221 and may identify second impedance change with respect to the second power transmission coil 222 based on a result measured by the power sensor 208 while the first power is applied to the second power transmission coil 222.

In operation 1205, according to an embodiment, the wireless power transmission device 200 may receive a first communication signal from the wireless power reception device 281 through the communication module 209 while the first power is sequentially applied to each of the plurality of power transmission coils 221 and 222.

In operation 1207, according to an embodiment, based on a reception time point of the first communication signal, a first time point at which the first power is started to be applied to the first power transmission coil 221, a second time point at which the first power is started to be applied to the second transmission coil 222, a first impedance change with respect to the first power transmission coil 221, and a second impedance change with respect to the second power transmission coil 222, the wireless power transmission device 200 may perform an operation of identifying a coil corresponding to a position of the wireless power reception device 281. For example, if both the first power transmission coil 221 and the second power transmission coil 222 are selected as coils corresponding to the position of the wireless power reception device 281 based on a reception time point of the first communication signal, a first time point at which the first power is started to be applied to the first power transmission coil 221, and a second time point at which the first power is started to be applied to the second transmission coil 222, the wireless power transmission device 200 may select the first power transmission coil 221 as a coil corresponding to a position of the wireless power reception device 281 responsive to the first impedance change exceeding a predetermined threshold value and the second impedance change not exceeding the predetermined threshold value.

Figure 13:
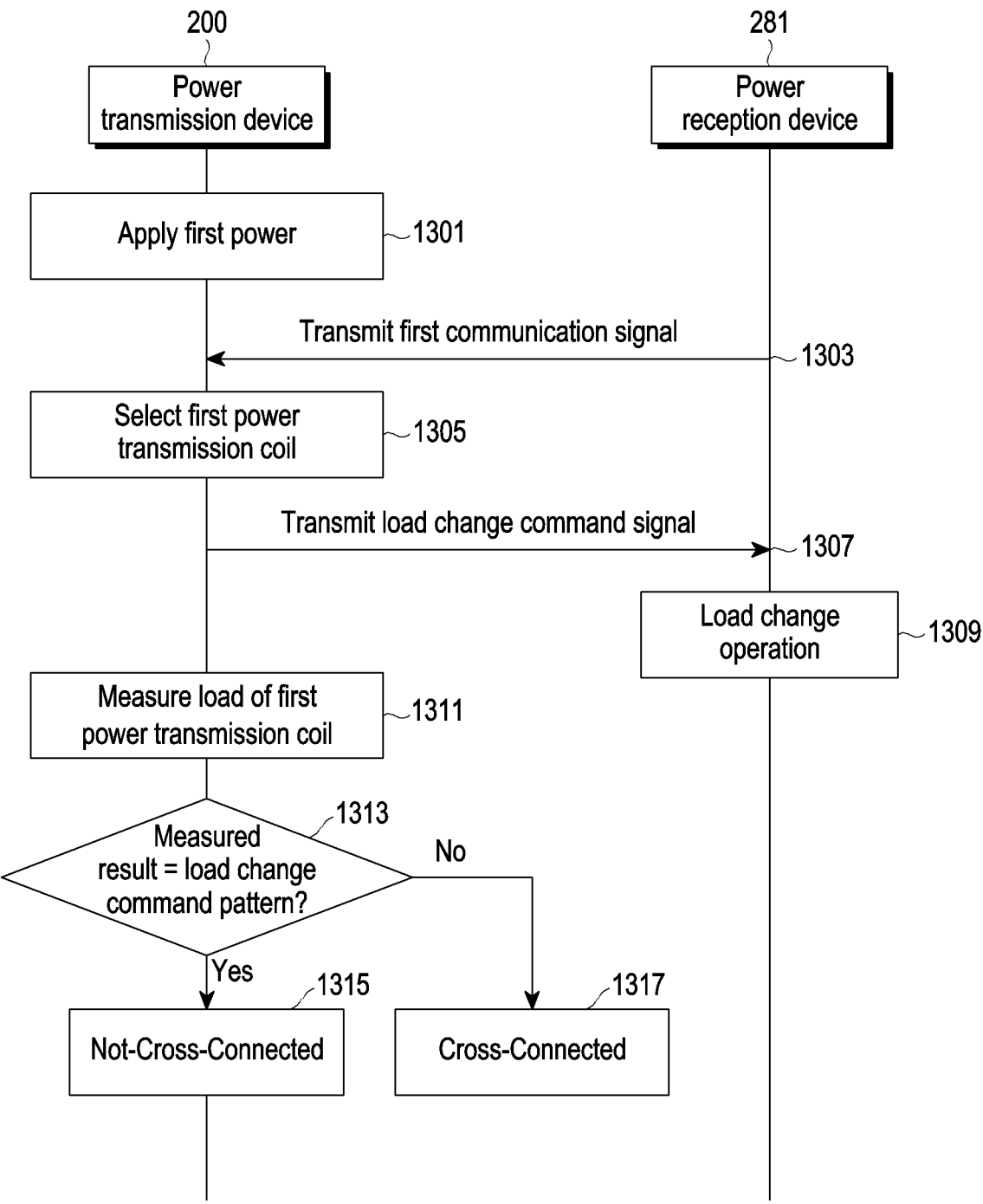
FIG. 13 is a signal flow diagram illustrating an operation method of a wireless power transmission device and a wireless power reception device according to an embodiment.

FIG. 13 is a signal flow diagram for an operation method of a wireless power transmission device and a wireless power reception device according to an embodiment. FIG. 13 will be described with reference to FIG. 2.

Referring to FIG. 13, according to an embodiment, in operation 1301, the wireless power transmission device 200 (e.g., the processor 201) may respectively control a plurality of inverters 211 and 212 to sequentially apply first power to each of a plurality of coils 221 and 222.

In operation 1303, according to an embodiment, the wireless power reception device 281 (e.g., the processor 295) may transmit the first communication signal through the communication module 297 by using the first power applied to one of the plurality of power transmission coils 221 and 222 of the wireless power transmission device 200. The wireless power transmission device 200 may receive the first communication signal transmitted by the wireless power reception device 281.

In operation 1305, according to an embodiment, the wireless power transmission device 200 may perform an operation of identifying the first power transmission coil 221 corresponding to a position of the wireless power reception device 281 based the first communication signal received from the wireless power reception device 281.

In operation 1307, according to an embodiment, after performing an operation of identifying the first power transmission coil 221, the wireless power transmission device 200 may transmit a signal including a load change command to the wireless power reception device 281 by using the communication module 209. The load change command may include a command to control a device receiving the load change command to change an internal load of the device in correspondence to a pattern of the load change command. For example, the pattern of the load change command may correspond to changing a load from a first value to a second value, maintaining the second value for a predetermined first period, and then returning the load to the first value. However, there is no limitation to the pattern.

In operation 1309, according to an embodiment, the wireless power reception device 281 may perform an operation of changing the internal load of the wireless power reception device 281 based on the received signal including the load change command. For example, the wireless power reception device 281 may connect at least one point inside the wireless power reception device 281 to a dummy circuit (not shown) designated by a communication signal for three seconds so as to respond to the pattern of the load change command. The dummy circuit may be an internal circuit used for load change of the wireless power reception device 281. However, occurrence of load change according to connection or release of the dummy load may be merely an example and there is no limitation to a load change scheme.

In operation 1311, according to an embodiment, the wireless power transmission device 200 may identify impedance change of the first power transmission coil 221 by using the power sensor 208. For example, the wireless power transmission device 200 may identify a load change of the first power transmission coil 221 by connecting the internal load of the wireless power reception device 281 to the dummy circuit (not shown) for three seconds. If the wireless power reception device 281 is disposed on a corresponding coil, the impedance change may correspond to a pattern designated by a communication signal. If the wireless power reception device 281 is not disposed on a corresponding coil, the impedance change may fail to correspond to a pattern designated by a communication signal.

In operation 1313, according to an embodiment, the wireless power transmission device 200 may identify whether the impedance change of the first power transmission coil 221 corresponds to the pattern of the load change command. If the impedance change of the first power transmission coil 221 corresponds to the pattern of the load change command (1313—Yes), the wireless power transmission device 200 may perform operation 1315. If the impedance change of the first power transmission coil 221 does not correspond to the pattern of the load change command (1313—No), the wireless power transmission device 200 may perform operation 1317.

In operation 1315, according to an embodiment, responsive to the impedance change of the first power transmission coil 221 corresponding to the pattern of the load change command, the wireless power transmission device 200 may identify that the first power transmission coil 221 and the power reception coil 291 of the wireless power reception device 281 are not cross connected.

According to an embodiment, responsive to identifying that the first power transmission coil 221 and the power reception coil 291 of the wireless power reception device 281 are not cross connected, the wireless power transmission device 200 may continuously transmit power to the wireless power reception device 281 by using the first power transmission coil 221.

In operation 1317, according to an embodiment, responsive to the impedance change of the first power transmission coil 221 not corresponding to the pattern of the load change command, the wireless power transmission device 200 may identify that the first power transmission coil 221 and the power reception coil 291 of the wireless power reception device 281 are cross connected.

According to an embodiment, based on identifying that the first power transmission coil 221 and the power reception coil 291 of the wireless power reception device 281 are cross connected, the wireless power transmission device 200 may stop an operation of transmitting power to the wireless power reception device 281 by using the first power transmission coil 221.

Figure 14:
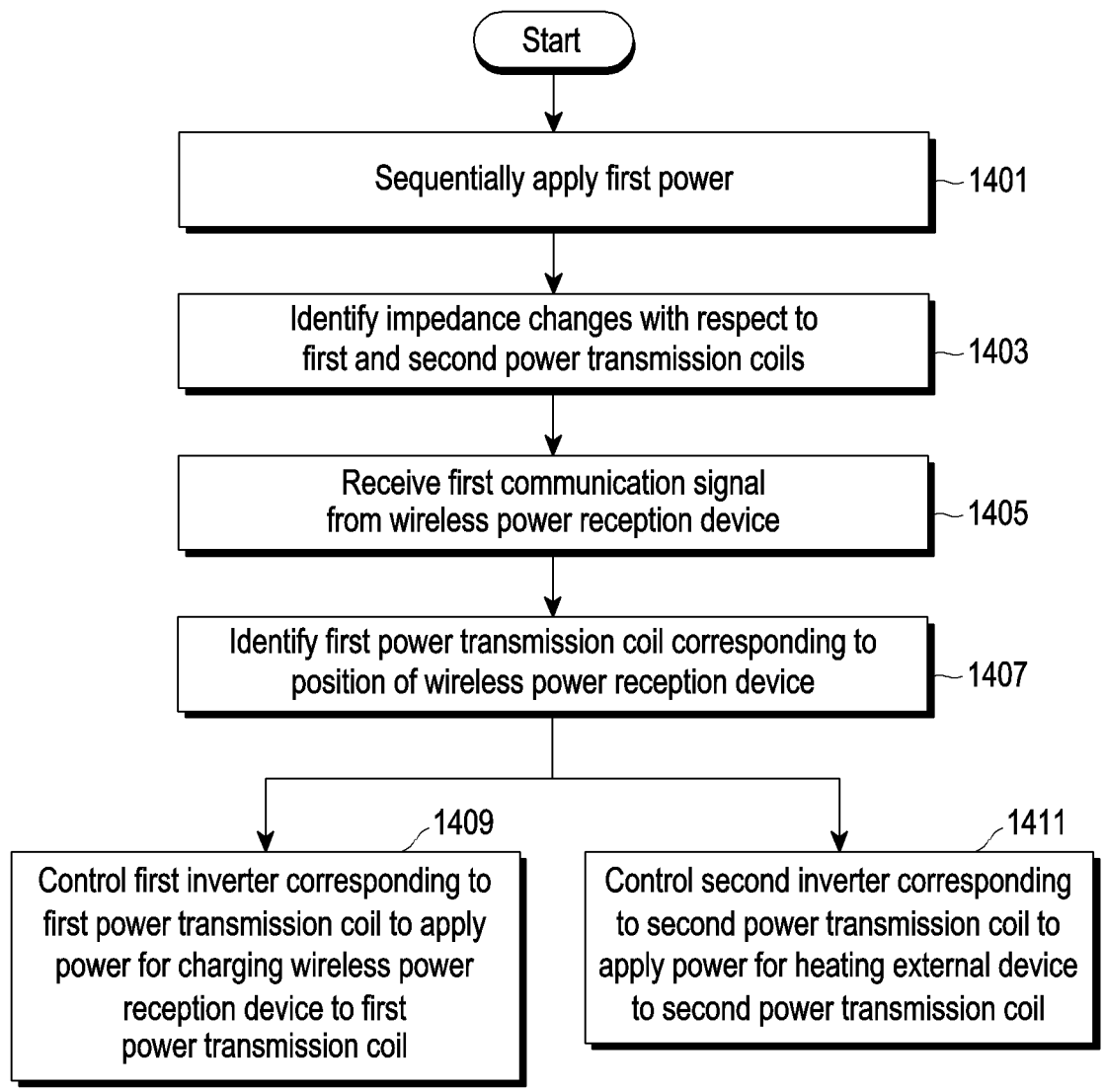
FIG. 14 is a flowchart illustrating an operation method of a wireless power transmission device according to an embodiment.

FIG. 14 is a flowchart illustrating an operation method of a wireless power transmission device according to an embodiment. FIG. 14 will be described with reference to FIG. 1A and FIG. 2.

As shown in FIG. 1B, the external electronic device 181 may be disposed on the first coil 121 of the electronic device 100 and the cooking vessel 182 may be disposed on the second coil 122 of the electronic device 100. That is, as shown in FIG. 2, FIG. 14 will be described on the assumption that the wireless power reception device 281 is mounted on the first power transmission coil 221 of the wireless power transmission device 200 and the cooking vessel 182 is additionally mounted on the second power transmission coil 222 of the wireless power transmission device 200.

Referring to FIG. 14, according to an embodiment, in operation 1401, as described above, the wireless power transmission device 200 (e.g., the processor 201) may respectively control a plurality of inverters 211 and 212 to sequentially apply first power to each of the plurality of coils 221 and 222.

In operation 1403, according to an embodiment, as described above, the wireless power transmission device 200 may identify first impedance change with respect to the first power transmission coil 221 and identify second impedance change with respect to the second power transmission coil 222.

In operation 1405, according to an embodiment, as described above, the wireless power transmission device 200 may receive a first communication signal from the wireless power reception device 281 through the communication module 209.

In operation 1407, according to an embodiment, as described above, the wireless power transmission device 200 may perform an operation of identifying the first power transmission coil 221 corresponding to a position of the wireless power reception device 281 based the first communication signal received from the wireless power reception device 281.

In operation 1409, according to an embodiment, the wireless power transmission device 200 may control the first inverter 211 corresponding to the first power transmission coil 221 to apply power for charging the wireless power reception device 281 to the first power transmission coil 221.

In operation 1411, according to an embodiment, simultaneously with or separately from performing operation 1409, the wireless power transmission device 200 may control the second inverter 212 corresponding to the second power transmission coil 222 to apply power for heating the cooking vessel 182 to the second power transmission coil 222.

Through operation 1409 and operation 1411, the wireless power transmission device 200 may either simultaneously or separately apply power for charging the wireless power reception device 281 and power for heating the cooking vessel 182.

According to an embodiment, the power for charging and the power for heating may have different output power [kW] and/or frequencies [Hz].

According to various embodiments, a wireless power transmission device (e.g., the wireless power transmission device 200) may include a plurality of power transmission coils (e.g., 221 and 222) configured to transmit power to a wireless power reception device (e.g., the wireless power reception device 281), a plurality of inverters (e.g., 211 and 212) configured to respectively apply alternating current power to a corresponding one of the plurality of power transmission coils, at least one communication module 209 using a frequency different from that of the power transmitted from the plurality of power transmission coils, and at least one processor 201. The at least one processor may be configured to control the plurality of inverters to thereby sequentially apply first power to the plurality of power transmission coils, receive a first communication signal from the wireless power reception device through the at least one communication module while the first power is sequentially applied to the plurality of power transmission coils, identify a first power transmission coil (e.g., the first power transmission coil 221) of the plurality of power transmission coils as corresponding to a position of the wireless power reception device based on a reception time point of the first communication signal and at least one time point at which the first power starts to be applied to a corresponding one of the plurality of power transmission coils, and control a first inverter (e.g., the first inverter 211) of the plurality of inverters corresponding to the first power transmission coil to thereby apply second power for charging the wireless power reception device to the first power transmission coil.

According to various embodiments, the at least one processor may be configured to respectively control the plurality of inverters using a clock signal identified based on power input to the plurality of inverters.

According to various embodiments, the wireless power transmission device may further include an oscillator, and the at least one processor may be configured to respectively control the plurality of inverters using a clock signal generated by the oscillator.

According to various embodiments, the plurality of power transmission coils may include a second power transmission coil, the plurality of inverters may include a second inverter corresponding to the second power transmission coil, and the at least one processor may be configured to control, based on the clock signal, the first inverter to apply the first power to the first power transmission coil for a predetermined duration starting from a first time point and control, based on the clock signal, the second inverter to apply the first power to the second power transmission coil for the predetermined duration starting from a second time point different from the first time point.

According to various embodiments, the first time point may be before the second time point, and the at least one processor may be configured to identify the first power transmission coil responsive to receipt of the first communication signal from the wireless power reception device between the first time point and the second time point.

According to various embodiments, the at least one processor may be configured to identify the first power transmission coil responsive to determining that a time interval between the first time point and the reception time point of the first communication signal is smaller than a predetermined reference value.

According to various embodiments, the first time point may be after the second time point, and the at least one processor may be configured to identify the first power transmission coil responsive to receipt of the first communication signal after the first time point and within the predetermined duration starting from the second time point, to respectively control the plurality of inverters to sequentially re-apply the first power to the plurality of power transmission coils.

According to various embodiments, the wireless power transmission device may further include a power sensor 208 connected to the plurality of power transmission coils, and the at least one processor may be configured to identify a first impedance change with respect to the first power transmission coil based on a result measured by the power sensor while the first power is applied to the first power transmission coil, identify a second impedance change with respect to the second power transmission coil based on a result measured by the power sensor while the first power is applied to the second power transmission coil, and identify the first power transmission coil based on the reception time point of the first communication signal, the first time point, the second time point, the first impedance change, and the second impedance change.

According to various embodiments, the at least one processor is further configured to control the communication module to transmit a load change command to the wireless power reception device after identifying the first power transmission coil, identify an impedance change with respect to the first power transmission coil based on a result measured by the power sensor after transmitting the load change command, and identify whether the impedance change corresponds to a pattern of the load change command.

According to various embodiments, the at least one processor may be configured to identify an impedance change with respect to a second power transmission coil of the plurality of power transmission coils based on a result measured by the power sensor, and control a second inverter of the plurality of inverters corresponding to the second power transmission coil to apply third power for heating an external device to the second power transmission coil based on the identified impedance change.

According to various embodiments, an operation method of a wireless power transmission device may include a process of controlling a plurality of inverters of the wireless power transmission device corresponding to one of a plurality of power transmission coils of the wireless power transmission device respectively, to sequentially apply first power to a plurality of power transmission coils of the wireless power transmission device, a process of receiving a communication signal from a wireless power reception device through at least one communication module of the wireless power transmission device while the first power is sequentially applied to the plurality of power transmission coils, a process of identifying a first power transmission coil, of the plurality of power transmission coils, as corresponding to a position of the wireless power reception device, based on a reception time point of the first communication signal and at least one time point at which the first power starts to be applied to a corresponding one of the plurality of power transmission coils, and a process of controlling a first inverter, of the plurality of inverters, corresponding to the first power transmission coil so that second power for charging the wireless power reception device is applied to the first power transmission coil.

According to various embodiments, the plurality of inverters may be controlled using a clock signal based on power input to the plurality of inverters.

According to various embodiments, the plurality of inverters may be controlled using a clock signal generated by an oscillator of the wireless power transmission device.

According to various embodiments, the first inverter may be controlled, based on the clock signal, to apply the first power to the first power transmission coil for a predetermined duration starting from a first time point, and the method may further include a process of controlling, based on the clock signal, a second inverter, corresponding to a second power transmission coil, to apply the first power to the second power transmission coil for the predetermined duration starting from a second time point different from the first time point.

According to various embodiments, the first time point may be before the second time point, and the identifying of the first power transmission coil may be responsive to receipt the first communication signal from the wireless power reception device between the first time point and the second time point.

According to various embodiments, the identifying of the first power transmission coil may be responsive to determining that a time interval between the first time point and a reception time point of the first communication signal is smaller than a predetermined reference value.

According to various embodiments, the first time point may be after the second time point, and the method may further include, responsive to receipt of the first communication signal within the predetermined time from the second time point after the first time point, a process of respectively controlling the plurality of inverters to sequentially re-apply the first power to the plurality of power transmission coils.

According to various embodiments, the method may further include a process of identifying a first impedance change with respect to the first power transmission coil based on a result measured by a power sensor of the wireless power transmission device while the first power is applied to the first power transmission coil, and a process of identifying a second impedance change with respect to the second power transmission coil based on a result measured by the power sensor while the first power is applied to the second power transmission coil, and the first power transmission coil may be identified based on the reception time point of the first communication signal, the first time point, the second time point, the first impedance change, and the second impedance change.

According to various embodiments, the method may further include a process of controlling the communication module to transmit a load change command to the wireless power reception device after identifying the first power transmission coil, identifying an impedance change with respect to the first power transmission coil based on a result measured by a power sensor of the wireless power transmission device after transmitting the load change command, and a process of identifying whether the impedance change corresponds to a pattern of the load change command.

According to various embodiments, the method may include a process of identifying an impedance change with respect to a second power transmission coil of the plurality of power transmission coils based on a result measured by a power sensor of the wireless power transmission device, and a process of controlling a second inverter, of the plurality of inverters, corresponding to the second power transmission coil, to apply third power for heating an external device to the second power transmission coil, based on the identified impedance change.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 100). For example, a processor (e.g., the processor 201) of the machine (e.g., the electronic device 100) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or a plurality of entities, and some of the plurality of entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wireless power transmission device comprising:
    a plurality of power transmission coils configured to transmit power to a wireless power reception device, the plurality of power transmission coils comprising a first power transmission coil and a second power transmission coil;
    a plurality of inverters configured to respectively apply alternating current power to a corresponding one of the plurality of power transmission coils, the plurality of inverters comprising a first inverter and a second inverter;
    at least one communication module using a frequency different from that of the power transmitted from the plurality of power transmission coils;
    at least one processor; and
    a memory storing instructions,
    wherein the instructions, when executed by at least one processor individually or collectively, cause the wireless power transmission device to:
        control the plurality of inverters to thereby sequentially apply first power to the plurality of power transmission coils, including controlling the first inverter to apply the first power to the first power transmission coil for a first predetermined duration starting from a first time point, and controlling the second inverter to apply the first power to the second power transmission coil for a second predetermined duration starting from a second time point, wherein the second time point is subsequent to the first time point and is during the first predetermined duration,
        receive a first communication signal from the wireless power reception device through the at least one communication module while the first power is sequentially applied to the plurality of power transmission coils,
        identify a corresponding power transmission coil, of the plurality of power transmission coils, as corresponding to a position of the wireless power reception device, based on a reception time point of the first communication signal relative to at least one time point at which the first power starts to be applied to the corresponding power transmission coil, and
        control a corresponding inverter, of the plurality of inverters, corresponding to the identified corresponding power transmission coil to apply second power for charging the wireless power reception device to the identified corresponding power transmission coil.

2. The wireless power transmission device of claim 1, wherein the instructions, when executed by at least one processor individually or collectively, cause the wireless power transmission device to control the plurality of inverters using a clock signal identified based on power input to the plurality of inverters.

3. The wireless power transmission device of claim 1, further comprising an oscillator,
    wherein the instructions, when executed by at least one processor individually or collectively, cause the wireless power transmission device to control the plurality of inverters using a clock signal generated by the oscillator.

4. The wireless power transmission device of claim 1,
    wherein the instructions, when executed by at least one processor individually or collectively, cause the wireless power transmission device to identify the corresponding power transmission coil based on the reception time point of the first communication signal from the wireless power reception device being between the first time point and the second time point.

5. The wireless power transmission device of claim 1, wherein the instructions, when executed by at least one processor individually or collectively, cause the wireless power transmission device to identify the corresponding power transmission coil based on determining that a time interval between the first time point and the reception time point of the first communication signal is smaller than a predetermined reference value.

6. The wireless power transmission device of claim 1,
    wherein the instructions, when executed by at least one processor individually or collectively, cause the wireless power transmission device to, based on receipt of the first communication signal after the first time point and within the predetermined duration starting from the second time point, to respectively control the plurality of inverters to sequentially and periodically re-apply the first power to the plurality of power transmission coils.

7. The wireless power transmission device of claim 1, further comprising a power sensor connected to the plurality of power transmission coils,
    wherein the instructions, when executed by at least one processor individually or collectively, cause the wireless power transmission device to:
        identify a first impedance change with respect to the first power transmission coil, based on a result measured by the power sensor while the first power is applied to the first power transmission coil,
        identify a second impedance change with respect to the second power transmission coil, based on a result measured by the power sensor while the first power is applied to the second power transmission coil, and
        identify the corresponding power transmission coil based on the reception time point of the first communication signal, the first time point, the second time point, the first impedance change, and the second impedance change.

8. The wireless power transmission device of claim 1, further comprising a power sensor connected to the plurality of power transmission coils,
    wherein the instructions, when executed by at least one processor individually or collectively, cause the wireless power transmission device to:
        control the at least one communication module to transmit a load change command to the wireless power reception device after identifying the corresponding power transmission coil,
        identify an impedance change with respect to the corresponding power transmission coil based on a result measured by the power sensor after transmitting the load change command, and identify whether the impedance change corresponds to a pattern of the load change command.

9. The wireless power transmission device of claim 1, further comprising a power sensor connected to the plurality of power transmission coils, wherein the instructions, when executed by at least one processor individually or collectively, cause the wireless power transmission device to:

identify an impedance change with respect to a second corresponding power transmission coil, of the plurality of power transmission coils, based on a result measured by the power sensor, and control a second corresponding inverter, of the plurality of inverters, corresponding to the identified second corresponding power transmission coil to apply third power for heating an external device to the second corresponding power transmission coil, based on the identified impedance change.

10. An operation method of a wireless power transmission device, the operation method comprising:

controlling a plurality of inverters of the wireless power transmission device, each of the plurality of inverters corresponding to one of a plurality of power transmission coils of the wireless power transmission device respectively, to thereby sequentially apply first power to the plurality of power transmission coils of the wireless power transmission device, wherein the controlling the plurality of inverters comprises controlling a first inverter, among the plurality of inverters, to apply the first power to a first power transmission coil, among the plurality of power transmission coils, for a first predetermined duration starting from a first time point, and controlling a second inverter, among the plurality of inverters, to apply the first power to a second power transmission coil, among the plurality of power transmission coils, for a second predetermined duration starting from a second time point, wherein the second time point is subsequent to the first time point and is during the first predetermined duration;

receiving a communication signal from a wireless power reception device through at least one communication module of the wireless power transmission device while the first power is sequentially applied to the plurality of power transmission coils;

identifying a corresponding power transmission coil, of the plurality of power transmission coils, as corresponding to a position of the wireless power reception device, based on a reception time point of the first communication signal relative to at least one time point at which the first power starts to be applied to the corresponding power transmission coil; and controlling a corresponding inverter, of the plurality of inverters, corresponding to the identified corresponding power transmission coil, to apply second power for charging the wireless power reception device to the corresponding power transmission coil.

11. The operation method of claim 10, wherein the controlling the plurality of inverters comprises using a clock signal identified based on power input to the plurality of inverters.

12. The operation method of claim 10, wherein the controlling the plurality of inverters comprises using a clock signal generated by an oscillator of the wireless power transmission device.

13. The operation method of claim 10, wherein the identifying the corresponding power transmission coil is based on the reception time point of the first communication signal from the wireless power reception device being between the first time point and the second time point.

* * * * *